US011609785B2

(12) United States Patent
Peng et al.

(10) Patent No.: US 11,609,785 B2
(45) Date of Patent: Mar. 21, 2023

(54) MATRIX DATA BROADCAST ARCHITECTURE

(71) Applicant: Advanced Micro Devices, Inc., Santa Clara, CA (US)

(72) Inventors: Li Peng, Shanghai (CN); Jian Yang, Shanghai (CN); Chi Tang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/729,811

(22) Filed: Dec. 30, 2019

(65) Prior Publication Data

US 2021/0191761 A1 Jun. 24, 2021

(30) Foreign Application Priority Data

Dec. 23, 2019 (CN) .......................... 201911336627.3

(51) Int. Cl.
*G06F 9/30* (2018.01)
*G06F 9/38* (2018.01)
(Continued)

(52) U.S. Cl.
CPC .......... *G06F 9/4881* (2013.01); *G06F 9/3004* (2013.01); *G06F 9/30047* (2013.01);
(Continued)

(58) Field of Classification Search
CPC .... G06F 9/3004; G06F 9/3824; G06F 9/3887; G06F 9/30036
See application file for complete search history.

(56) References Cited

U.S. PATENT DOCUMENTS

| 4,727,537 | A | 2/1988 | Nichols |
| 5,379,297 | A | 1/1995 | Glover et al. |

(Continued)

FOREIGN PATENT DOCUMENTS

| EP | 1052816 A2 | 11/2000 |
| WO | 9703549 A2 | 2/1997 |

OTHER PUBLICATIONS

Seungyo Ryu and Dongseung Kim "Parallel Huge Matrix Multiplication on a Cluster with GPGPU Accelerators" 2018 IEEE International Parallel and Distributed Processing Symposium Workshops (Year: 2018).*

(Continued)

*Primary Examiner* — Jacob Petranek
(74) *Attorney, Agent, or Firm* — Kowert Hood Munyon Rankin and Goetzel PC; Rory D. Rankin

(57) ABSTRACT

Systems, apparatuses, and methods for efficient parallel execution of multiple work units in a processor by reducing a number of memory accesses are disclosed. A computing system includes a processor core with a parallel data architecture. The processor core executes a software application with matrix operations. The processor core supports the broadcast of shared data to multiple compute units of the processor core. A compiler or other code assigns thread groups to compute units based on detecting shared data among the compute units. Rather than send multiple read accesses to a memory subsystem for the shared data, the processor core generates a single access request. The single access request includes information to identify the multiple compute units for receiving the shared data when broadcasted by the processor core.

20 Claims, 9 Drawing Sheets

(51) Int. Cl.
  *G06F 9/48* (2006.01)
  *G06F 9/46* (2006.01)
  *G06F 9/32* (2018.01)
  *G06F 9/54* (2006.01)

(52) U.S. Cl.
  CPC ............ *G06F 9/321* (2013.01); *G06F 9/3824* (2013.01); *G06F 9/3887* (2013.01); *G06F 9/468* (2013.01); *G06F 9/542* (2013.01)

(56) References Cited

U.S. PATENT DOCUMENTS

| | | | |
|---|---|---|---|
| 5,440,547 A | 8/1995 | Easki et al. | |
| 5,784,003 A | 7/1998 | Dahlgren | |
| 5,857,078 A | 1/1999 | Date | |
| 5,892,766 A | 4/1999 | Wicki et al. | |
| 5,898,687 A | 4/1999 | Harriman et al. | |
| 5,901,147 A | 5/1999 | Joffe | |
| 5,905,998 A | 5/1999 | Ebrahim et al. | |
| 5,915,104 A | 6/1999 | Miller | |
| 5,918,074 A | 6/1999 | Wright et al. | |
| 5,970,229 A | 10/1999 | Thomas et al. | |
| 6,295,295 B1 | 9/2001 | Wicklund | |
| 6,304,570 B1 | 10/2001 | Sakurai et al. | |
| 6,396,809 B1 | 5/2002 | Holden et al. | |
| 6,417,944 B1 | 7/2002 | Lahat et al. | |
| 6,484,224 B1 | 11/2002 | Robins et al. | |
| 6,542,502 B1 | 4/2003 | Herring et al. | |
| 6,553,446 B1 | 4/2003 | Miller | |
| 6,556,571 B1 | 4/2003 | Shahrier et al. | |
| 6,604,190 B1* | 8/2003 | Tran ................ | G06F 9/383 712/204 |
| 6,611,519 B1 | 8/2003 | Howe | |
| 6,629,147 B1 | 9/2003 | Grow | |
| 6,654,346 B1 | 11/2003 | Mahalingaiah et al. | |
| 6,661,774 B1 | 12/2003 | Lauffenburger et al. | |
| 6,674,754 B1 | 1/2004 | Ofek | |
| 6,687,247 B1 | 2/2004 | Wilford et al. | |
| 6,735,679 B1 | 5/2004 | Herbst et al. | |
| 6,745,277 B1 | 6/2004 | Lee et al. | |
| 6,751,698 B1 | 6/2004 | Deneroff et al. | |
| 6,754,211 B1 | 6/2004 | Brown | |
| 6,754,222 B1 | 6/2004 | Joung et al. | |
| 6,760,337 B1 | 7/2004 | Snyder, II et al. | |
| 6,768,717 B1 | 7/2004 | Reynolds et al. | |
| 6,781,994 B1 | 8/2004 | Nogami et al. | |
| 6,907,001 B1 | 6/2005 | Nakayama et al. | |
| 6,912,637 B1 | 6/2005 | Herbst | |
| 6,940,814 B1 | 9/2005 | Hoffman | |
| 6,950,394 B1 | 9/2005 | Chou et al. | |
| 6,950,430 B2 | 9/2005 | Kalkunte et al. | |
| 6,952,401 B1 | 10/2005 | Kadambi et al. | |
| 6,959,002 B2 | 10/2005 | Wynne et al. | |
| 6,975,638 B1 | 12/2005 | Chen et al. | |
| 6,996,099 B1 | 2/2006 | Kadambi et al. | |
| 6,999,415 B2 | 2/2006 | Luijten et al. | |
| 7,002,926 B1 | 2/2006 | Eneboe et al. | |
| 7,145,869 B1 | 12/2006 | Kadambi et al. | |
| 7,274,692 B1 | 9/2007 | Hughes | |
| 9,817,594 B2 | 11/2017 | Holbrook et al. | |
| 9,836,412 B2 | 12/2017 | McConnell | |
| 10,459,859 B2 | 10/2019 | Jain et al. | |
| 2003/0035371 A1 | 2/2003 | Reed et al. | |
| 2011/0314255 A1 | 12/2011 | Krishna et al. | |
| 2014/0115224 A1* | 4/2014 | Sanghai ............ | G06F 13/4022 710/317 |
| 2015/0242212 A1* | 8/2015 | Sudhakar ........... | G06F 9/30192 712/210 |
| 2019/0042542 A1* | 2/2019 | Narayanamoorthy .. | G06F 9/383 |
| 2019/0227750 A1* | 7/2019 | Srinivasan ............ | G06F 3/0679 |
| 2020/0065352 A1* | 2/2020 | Valentine ............ | G06F 9/30149 |
| 2020/0089550 A1 | 3/2020 | Christidis et al. | |
| 2020/0210180 A1* | 7/2020 | Ould-Ahmed-Vall ....................... | G06F 9/30018 |

OTHER PUBLICATIONS

International Search Report for PCT/US02/26813, dated Oct. 30, 2002, 6 pages.

\* cited by examiner

| Broadcast Identifier 512 | Total Broadcast Thread Group Number 514 | Iteration Size 516 | Base Address 518 | Broadcast Thread Group Start Counter 520 | Compute Unit Mask 522 | Size of Shared Data 524 |
|---|---|---|---|---|---|---|
| 0 | 4 | ½ of Matrix B column or block (or 512B or 16 data items) | 0x04DE_8F10 | 3 | 0xF000 | 2KB (or 0x04DE_970F) |
| 1 | 4 | ½ of Matrix B column or block (or 512B or 16 data items) | 0x04DE_9710 | 1 | 0x0F00 | 2KB (or 0x04DE_9F0F) |
| 2 | 4 | ½ of Matrix B column or block (or 512B or 16 data items) | 0x04DE_9F10 | 0 | 0x00F0 | 2KB (or 0x04DE_A70F) |

Table 500

FIG. 5

```
// Pseudo Shader Program
// for a particular one of multiple
// Broadcast Identifiers
//
// Each iteration is a subset of a column (shared data)
// of Matrix B
    // Below is New Code
    Provide Mapping of Thread Groups
    to Compute Units by Building Tables
    that Support the Broadcast
    of Shared Data
    // Above is New Code
    for i = 0; i < iterations; i++
        // Below is New Code
        Broadcast Start (provide identifier and
                target address)
        // Above is New Code
        Fetch data for Matrix A
        Store fetched data in Local Data Stores
                of assigned Compute Units
        // Below is New Code
        Wait for a number of data fetch requests
                for data of Matrix B before
                fetching shared data
        Fetch the shared data
        Broadcast the fetched shared data to
                Local Data Stores of the assigned
                Compute Units
        // Above is New Code
        Load data into Compute Units from
                Local Data Stores
        Perform Matrix Operation using the data
```

Code 600

Code Segment 610

Code Segment 620

Code Segment 630

FIG. 6

MATRIX DATA BROADCAST ARCHITECTURE

PRIORITY INFORMATION

This application claims benefit of priority to Chinese Application No. 201911336627.3, entitled "MATRIX DATA BROADCAST ARCHITECTURE", filed Dec. 23, 2019, the entirety of which is incorporated herein by reference in its entirety.

BACKGROUND

Description of the Related Art

The parallelization of tasks is used to increase the throughput of computing systems. To this end, compilers extract parallelized tasks from program code to execute in parallel on the system hardware. Processor cores include deep pipelines configured to perform multi-threading. To further increase parallel execution on the hardware, a multi-core architecture includes multiple processor cores. The computing system offloads specific tasks to special-purpose hardware, which overcomes the performance limitations of conventional general-purpose cores. Some types of the special-purpose hardware include a single instruction multiple data (SIMD) parallel architecture, other types include a field-programmable gate array (FPGA), and yet other types include other specialized types of processing cores. When an architecture includes multiple cores of different types it is referred to as a heterogeneous multi-core architecture. Heterogeneous multi-core architectures provide higher instruction throughput than a homogeneous multi-core architecture for particular tasks such as graphics rendering, neural network training, cryptography and so forth.

Designers use one of multiple types of parallel computing platforms and application programming interface (API) models for developing software applications for heterogeneous computing. A function call in these platforms is referred to as a "compute kernel", or simply a "kernel". Software, such as an operating system scheduler, matches these software kernels with one or more records of data, such as data items, to produce one or more work units of computation. Generally speaking, a SIMD architecture offers good computing performance and cost efficiency when executing such data parallel workloads. However, performance reduces when memory bandwidth is limited and the application has high data reuse causing multiple memory accesses for the same data.

In view of the above, efficient systems and apparatuses for parallel execution of multiple work units in a processor by reducing a number of memory accesses are desired.

BRIEF DESCRIPTION OF THE DRAWINGS

The advantages of the methods and mechanisms described herein may be better understood by referring to the following description in conjunction with the accompanying drawings, in which:

FIG. 5 is a block diagram of one embodiment of a table used for supporting the broadcast of shared data for matrices.

FIG. 6 is a block diagram of one embodiment of computer program code used for supporting the broadcast of shared data for matrices.

Figure 1:
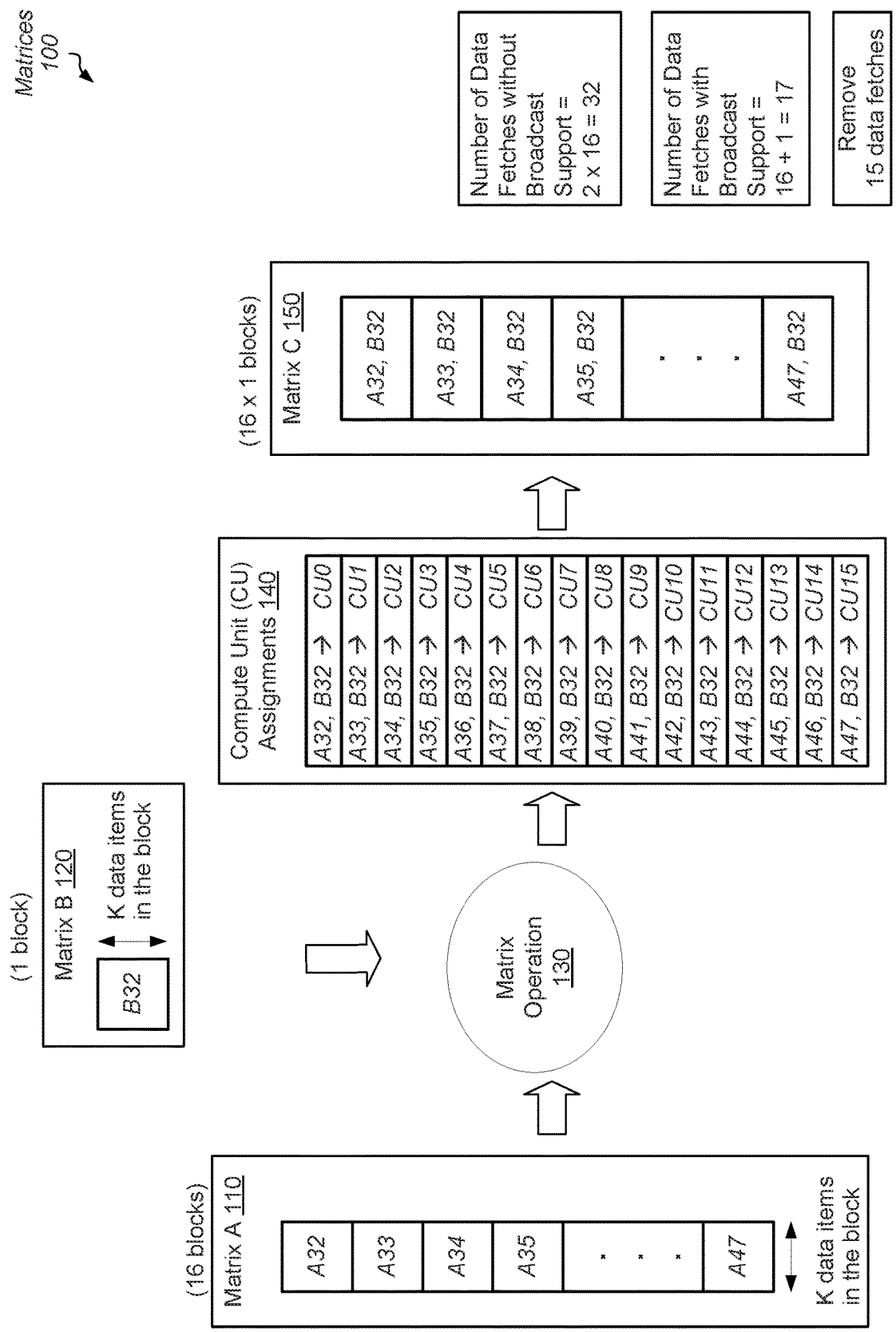
FIG. 1 is a block diagram of one embodiment of matrices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficient parallel execution of multiple work units in a processor by reducing a number of memory accesses are disclosed. In various embodiments, a computing system includes memory for storing an operating system, software applications developed by designers, and both user data and result data of the software applications. The computing system also includes a processing unit, which accesses the memory and executes instructions of the operating system and the applications. The processing unit includes one or more processor cores with a single instruction multiple data (SIMD) parallel architecture. In an embodiment, an accelerated processing unit on a motherboard includes the SIMD processor cores in addition to a general-purpose processor. In another embodiment, a video graphics card includes the SIMD processor cores. One or more of the software applications include instructions for directing a SIMD core to perform General Matrix to Matrix Multiplication (GEMINI) operations such as multiplying two input matrices together to generate a third output matrix.

In one embodiment, the GEMM operations are used for neural network applications. For example, the application includes algorithms for the training of deep neural networks. Another software application is a graphics shader program directing how a SIMD processor core renders pixels for controlling lighting and shading effects. In addition, the application includes pixel interpolation algorithms for geometric transformations. Pixel interpolation obtains new pixel values at arbitrary coordinates from existing data. Yet other software applications include instructions for directing a SIMD core to perform GEMM operations for other scientific and business uses. The software application instructions operate on matrices with a number of rows and columns in a range of a few hundred to a few thousand, which results in a number of floating-point operations (FLOPs) in a range of a few million to a few billion.

In some embodiments, the designers use a parallel computing platform and corresponding application programming interface (API) models for developing the software applications using GEMM operations. An example of the parallel computing platform is the OpenCL® (Open Computing Language) framework. The OpenCL framework (generally referred to herein as "OpenCL") includes a C-like language. For video graphics applications, one example of the language is the GLSL (OpenGL Shading Language). A function call in the C-like language is referred to as an OpenCL kernel, a software kernel, a compute kernel, or simply a "kernel". Rather than use a scheduler of an operating system, in some embodiments, a compiler or other software code includes instructions executable by a processor to assign multiple compute kernels of a software application performing GEMM operations to multiple compute units of a SIMD processor core. In some embodiments, the software application includes code segments that include instructions for supporting a shared data broadcast protocol in which shared data is broadcast to multiple compute units. In the shared data broadcast protocol, multiple compute units requiring shared data generate a request for the data, but only a single fetch of the data is generated. When the fetched data returns (e.g., from a cache, memory, etc.), it is broadcast to the compute units that requested the data. In this manner, memory bus bandwidth is not unnecessarily consumed by multiple fetch requests. In various embodiments, the compute kernels executing on the compute units of the SIMD processor core do not communicate with one another regarding the shared data and receive no indication from any other compute kernel specifying that the shared data is shared with any other compute unit.

In various embodiments, the SIMD processor core includes hardware, such as circuitry, for supporting a shared data broadcast protocol. The SIMD processor core stores broadcast characteristics for the shared data. The characteristics include a broadcast identifier, which is a unique identifier identifying the shared data, and a base address specifying a memory location storing a beginning of the shared data. In some embodiments, the characteristics also include a sum of the total number of compute units using the shared data. When the SIMD processor core detects read access requests targeting shared data, the SIMD processor core increments a count of compute units sending read access requests targeting particular shared data. When the count of compute units targeting the shared data is equal to the stored sum, the SIMD processor core issues a single access request targeting the shared data.

In other embodiments, the SIMD processor core monitors a count of threads in a thread group requesting the shared data among the multiple compute units. The sum is a sum of threads from the multiple compute units. In one embodiment, the SIMD processor core generates the single access request when the count equals a sum of 32 threads from each of four compute units. Although, in an embodiment, each of the compute units of the SIMD processor core includes 64 parallel lanes for executing 64 threads, the SIMD processor core generates the single read access request after each of the four compute units generates one or more read access requests for providing data to 32 lanes of the 64 lanes. Another number of total parallel lanes and other portions of the total number of lanes used for determining when to generate the single read access request are possible and contemplated. In yet other embodiments, the SIMD processor core monitors an amount of shared data requested by the multiple read access requests from the multiple compute units, rather than a number of compute units or a number of parallel lanes within the compute units.

In an embodiment, the SIMD processor core inserts in the single access request a mask identifying the compute units using the shared data. In another embodiment, the SIMD processor core generates the mask based on the broadcast identifier. In such embodiments, the single access request includes the broadcast identifier, but not the mask. In other embodiments, the single access request includes the mask, but not the broadcast identifier. When the SIMD processor core determines that the memory subsystem returns the shared data, the SIMD processor core broadcasts the shared data to the compute units identified by the mask. Therefore, the performance degradation effects based on the limits of the memory subsystem bandwidth are reduced due to the single access request and the broadcast of the retrieved shared data.

Referring to FIG. 1, one embodiment of matrices 100 used in operations is shown. As shown, Matrix A 110 and Matrix B 120 are inputs to a matrix operation 130, which generates Matrix C 150. The matrix operation 130 and the matrices 110, 120 and 150 are used in the training of neural networks, pixel interpolation during video graphics rendering, or one of a multiple other scientific and business applications. In various embodiments, the matrix operation 130 is a General Matrix to Matrix Multiplication (GEMM) operation. For example, in some embodiments, the matrix operation 130 is a multiply and accumulate (MAC) operation used to determine a dot product of two values of two input matrices. In other embodiments, the matrix operation 130 is another mathematical operation used to generate a third matrix, such as Matrix C 150, from two input matrices such as Matrix A 110 and Matrix B 120. Also shown are the assignments 140 of the input data values of the matrices 110 and 120 to compute units of a processor core with a single instruction multiple data (SIMD) parallel architecture. In an embodiment, the SIMD processor includes 16 compute units, each compute unit with 64 lanes of execution. In other embodiments, the SIMD processor core includes another number of compute units and another number of lanes per compute unit.

The Matrix A 110 is shown to include 16 blocks labeled A32 to A47. In one embodiment, each of the 16 blocks includes K data items where K is a positive, non-zero integer. In such an embodiment, the Matrix A 110 has a number of data items equal to 16 times K. Similarly, the Matrix B 120 is shown to include 1 block labeled B32. This single block has a number of data items equal to 1 times K, or K data items. The value K can be any number, and therefore, the matrices 110 and 120 are capable of being very large. For example, the number K of data items can have a range of a few dozen to a few hundred or even to a few thousand. When the range reaches a few thousand, the number of operations for the matrix operation 130 reaches a range of a few million to a few billion. In other embodiments, the value K represents an amount of data, which includes multiple data items. For example, if the value K represents 64 bytes and a data item has a size of 32 bits (4 bytes), then the value K represents (64/4) data items, or 16 data items.

The Matrix C 150 is shown to include 16×1 blocks labeled (A32, B32) to (A47, B32). Each block of the Matrix C 150 includes a combination performed by the matrix operation 130 of a block of Matrix A 110 with the block B32 of Matrix B 120. Therefore, the data items in the matrices 110 and 120 are combined by the matrix operation 130 in an order shown in the Matrix C 150 by the block labels. In some embodiments, a SIMD processor core performs the steps of the matrix operation 130 in a concurrent and parallel manner. In various embodiments, a computing system includes memory for storing the software application written by software developers, and both user data and result data of the software applications. Here, the user data are the data items of the Matrix A 110 and Matrix B 120 while the result data are the data items of Matrix C 150.

In an embodiment, the SIMD processor core includes 16 compute units (CUs) as shown in the assignments 140, although in other embodiments, the SIMD processor core includes another number of compute units. Using the assignments 140, the compute unit 0 (CU0) of the SIMD processor core combines the data in block A32 of Matrix A 110 with the data in block B32 of Matrix B 120 using the steps of matrix operation 130. The software application written by software developers includes the steps of matrix operation 130. For example, the software application uses a function call with a definition defined in a particular library. The software developers use one of multiple types of parallel computing platforms and application programming interface (API) models for developing software applications. A function call in these platforms is referred to as a "compute kernel", or simply a "kernel".

In various embodiments, the memory also stores instructions of an operating system. In some embodiments, the instructions of the operating system are executed by a general-purpose processor core in the computing system. In one embodiment, the application or firmware matches these software kernels with one or more records of data, such as data items, to produce one or more work units of computation. The work units are partitioned into work groups, which are also referred to as "thread groups." Each thread group has an assigned unique identifier (ID). Rather than have the scheduler assign the thread groups to compute units, the SIMD processor core manages the assignments. For example, when a compute unit has 64 parallel lanes of execution, the application or firmware partitions the work units into groups of 64, and the SIMD processor core assigns a thread group of 64 work units to a particular compute unit. The SIMD processor core performs the assignments shown in the compute unit assignments 140 (or assignments 140).

In a similar manner, the compute unit 1 (CU1) of the SIMD processor core is assigned to combine the data in block A33 of Matrix A 110 with the data in block B32 of Matrix B 120 using the steps of matrix operation 130. Likewise, the compute unit 15 (CU15) of the SIMD processor core combines the data in block A47 of Matrix A 110 with the data in block B32 of Matrix B 120 using the steps of matrix operation 130, and so on for the compute units between CU1 and CU 15. In some embodiments, the data of the matrices 110 and 120 are loaded into the compute units 0-15 of the SIMD processor core as many times as needed based on the assignments 140. For example, if K represents 256 data items with each data item having a 4 byte size, and each compute unit has 64 lanes of execution with each lane supporting operations on 4-byte data items, then the SIMD processor core uses (256/64) loads, or 4 loads to fill the 64 parallel execution lanes with data from block A32 and block B32.

Generally speaking, the SIMD architecture offers good computing performance and cost efficiency when executing parallel data workloads. However, performance reduces when memory bandwidth is limited and the application has high data reuse causing multiple memory accesses for the same data. As shown in the assignments 140, data reuse is typical in GEMM calculations. For example, each of the compute units CU0-CU15 loads and uses the same data in block B32 of Matrix B 120.

Without modification to the execution of the software application, in the illustrated embodiment, the SIMD processor core generates 32 data fetches with 2 data fetches per compute unit. For example, compute unit 0 (CU0) uses 2 data fetches for data in block A32 and block B32. Similarly, compute unit 8 (CU8) uses 2 data fetches for data in block A40 and the same block B32. However, if the SIMD processor core is modified to include broadcast support of reuse data, then the SIMD processor core generates 17 data fetches, rather than 32 data fetches. For example, if the software application includes instructions for supporting fetching data in block B32 only once and broadcasting the fetched data to compute units 0-15, then the SIMD processor core generates 16 data fetches for data in blocks A32-A47 and a single data fetch for data in block B32. The number of data fetches decreases from 32 data fetches to 17 data fetches.

In one example, one or more buses in the memory subsystem is smaller than the amount of data in the block B32 of Matrix B 120. Therefore, multiple data fetches occur for a "single" data fetch of the data in block B32, and the buses are used multiple times when transporting the data in the block B32. For example, when a bus to memory storing the data in block B32 has a width of 64 bytes, but the amount of data in block B32 is 512 bytes, the data fetch for block B32 uses eight separate data transports on the bus. When the data in block B32 is fetched multiple times, such as 16 times for each of the sixteen compute units in one embodiment, the resources of the memory subsystem are heavily loaded and latencies increase. Using the above example, without broadcast support, there are (16×8), or 128 data fetches for the 512 bytes of the block B32. As latencies increase, performance decreases. However, if the SIMD processor core supports the broadcast of the data in block B32, and this data is fetched only once, rather than fetched for each of the sixteen compute units, then there are 8 data fetches for the 512 bytes of the block B32 compared to the 128 data fetches. Accordingly, the memory subsystem is not loaded as before, latencies decrease, and performance increases.

Figure 2:
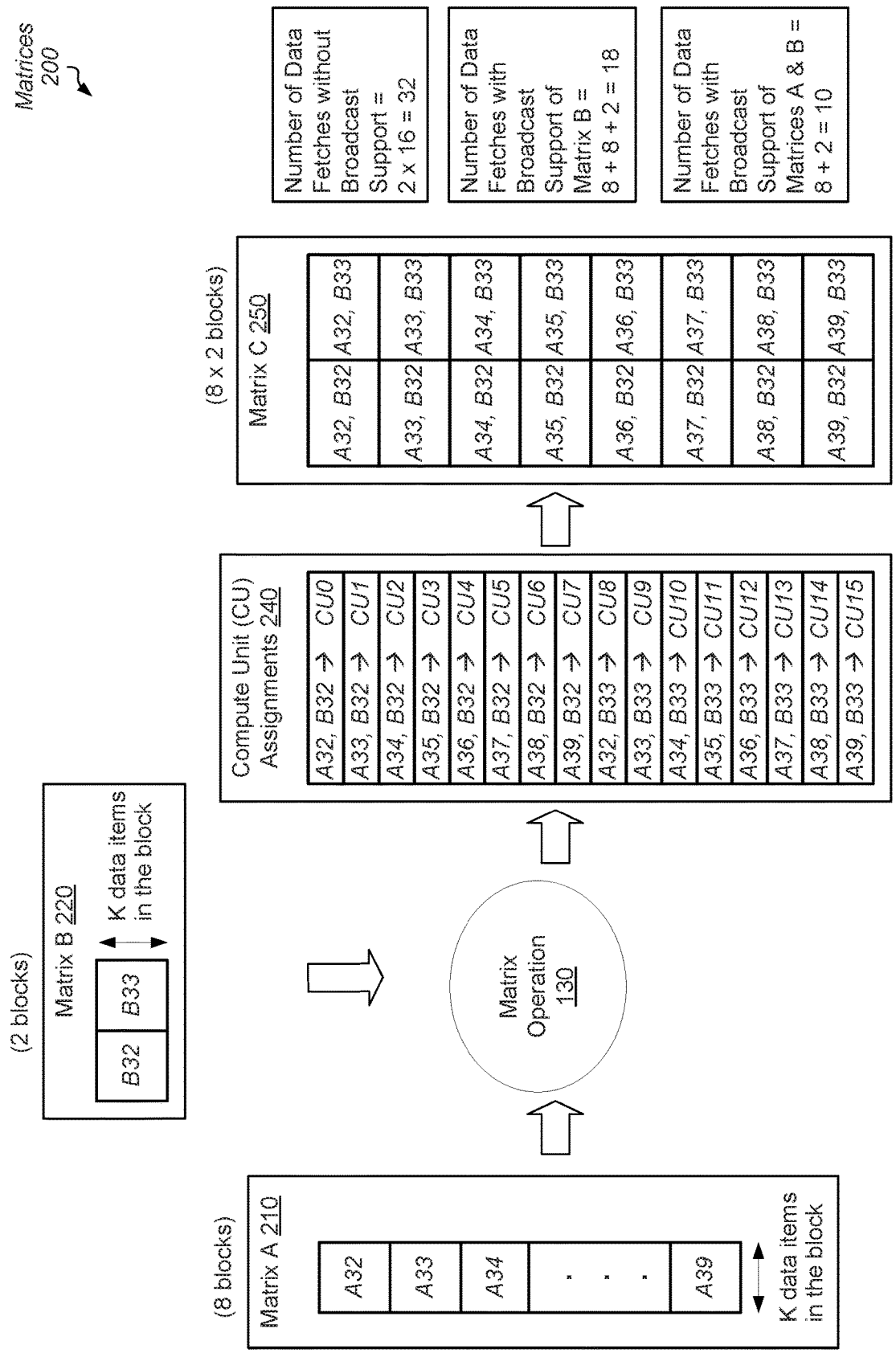
FIG. 2 is a block diagram of one embodiment of matrices.

Turning now to FIG. 2, one embodiment of matrices 200 used in operations is shown. Control logic described earlier is numbered identically. As shown, Matrix A 210 and Matrix B 220 are inputs to a matrix operation 130, which generates Matrix C 250. Similar to the matrices 100, the matrix operation 130 and the matrices 210, 220 and 250 are used in the training of neural networks, pixel interpolation during video graphics rendering, or one of a multiple other scientific and business applications. In various embodiments, the matrix operation 130 is a General Matrix to Matrix Multiplication (GEMM) operation. Also shown are the assignments 240 of the input data values of the matrices 210 and 220 to compute units of a SIMD processor core.

The Matrix A 210 is shown to include 8 blocks labeled A32 to A39. In one embodiment, each of the 8 blocks includes K data items. In such an embodiment, the Matrix A 210 has a number of data items equal to 8 times K. Similarly, the Matrix B 220 is shown to include 2 blocks labeled B32 and B33. Matrix B 220 has a number of data items equal to 2 times K. As described earlier, K is a positive, non-zero integer. The value K can be any number, and therefore, the matrices 210 and 220 are capable of being very large. In other embodiments, the value K represents an amount of data, which includes multiple data items. For example, if the value K represents 512 bytes and a data item has a size of 64 bits (8 bytes), then the value K represents (512/8) data items, or 64 data items.

The Matrix C 250 is shown to include 8×2 blocks labeled (A32, B32) and (A32, B33) to (A39, B32) and (A39, B33). Each block of the Matrix C 250 includes a combination performed by the matrix operation 130 of a block of Matrix A 210 with a block of Matrix B 220. Therefore, the data items in the matrices 210 and 220 are combined by the matrix operation 130 in an order shown in the Matrix C 250 by the block labels. In some embodiments, a SIMD processor core performs the steps of the matrix operation 130 in a concurrent and parallel manner.

In an embodiment, the SIMD processor core includes 16 compute units (CUs) as shown in the compute unit assignments 240 (or assignments 240), although in other embodiments, the SIMD processor core includes another number of compute units. Using the assignments 240, the compute unit 0 (CU0) of the SIMD processor core combines the data in block A32 of Matrix A 210 with the data in block B32 of Matrix B 220 using the steps of matrix operation 130. In a similar manner, the compute unit 1 (CU1) of the SIMD processor core is assigned to combine the data in block A33 of Matrix A 210 with the data in block B32 of Matrix B 220 using the steps of matrix operation 130. Likewise, the compute unit 15 (CU15) of the SIMD processor core combines the data in block A39 of Matrix A 210 with the data in block B33 of Matrix B 220 using the steps of matrix operation 130, and so on for the compute units between CU1 and CU 15.

In some embodiments, the data of the matrices 210 and 220 are loaded into the compute units 0-15 of the SIMD processor core as many times as needed based on the assignments 240. For example, if K represents 64 data items with each data item having a 8 byte size, and each compute unit has 32 lanes of execution with each lane supporting operations on 8-byte data items, then the SIMD processor core uses (64/32) loads, or 2 loads to fill the 32 parallel execution lanes with data from block A32 and block B32. As shown in the assignments 240, data reuse is typical in GEMM calculations. For example, each of the compute units CU0-CU7 loads and uses the same data in block B32 of Matrix B 220. Similarly, each of the compute units CU8-CU15 loads and uses the same data in block B33 of Matrix B 220.

Without modification to the SIMD processor core executing the matrix operation 130, in the illustrated embodiment, the SIMD processor core generates 32 data fetches with 2 data fetches for each of the 16 compute units. For example, compute unit 0 (CU0) uses 2 data fetches for data in block A32 and block B32. Similarly, compute unit 7 (CU7) uses 2 data fetches for data in block A39 and the same block B32. However, if the software application is modified to support a shared data broadcast protocol, then the software application generates 18 data fetches, rather than 32 data fetches. For example, if the SIMD processor core fetches data in block B32 only once and broadcasts the fetched data to compute units 0-7, then for the left-most column of Matrix C 250, the SIMD processor core generates 8 data fetches for data in blocks A32-A39 and a single data fetch for data in block B32. The number of data fetches for the left-most column of Matrix C 250 decreases from 16 data fetches to 9 data fetches.

If the SIMD processor core fetches data in block B33 only once and broadcasts the fetched data to compute units 8-15, then for the right-most column of Matrix C 250, the SIMD processor core generates 8 data fetches for data in blocks A32-A39 and a single data fetch for data in block B33. The number of data fetches for the right-most column of Matrix C 250 decreases from 16 data fetches to 9 data fetches. The total number of data fetches decreases from (16+16) data fetches, or 32 data fetches, to (9+9) data fetches, or 18 data fetches. If the SIMD processor core fetches shared data in blocks A32-A39 of Matrix A 210 only once and broadcasts the fetched, shared data to compute units 0-15, then the SIMD processor core generates 8 data fetches for data in blocks A32-A39, a single data fetch for data in block B32, and a data in block B33, which provides (8+1+1) data fetches, or 10 data fetches. As described earlier for matrices 100, when the SIMD processor core supports the broadcast of the data, the data is fetched only once, the memory subsystem is not loaded as before without broadcast support, latencies decrease, and performance increases.

Figure 3:
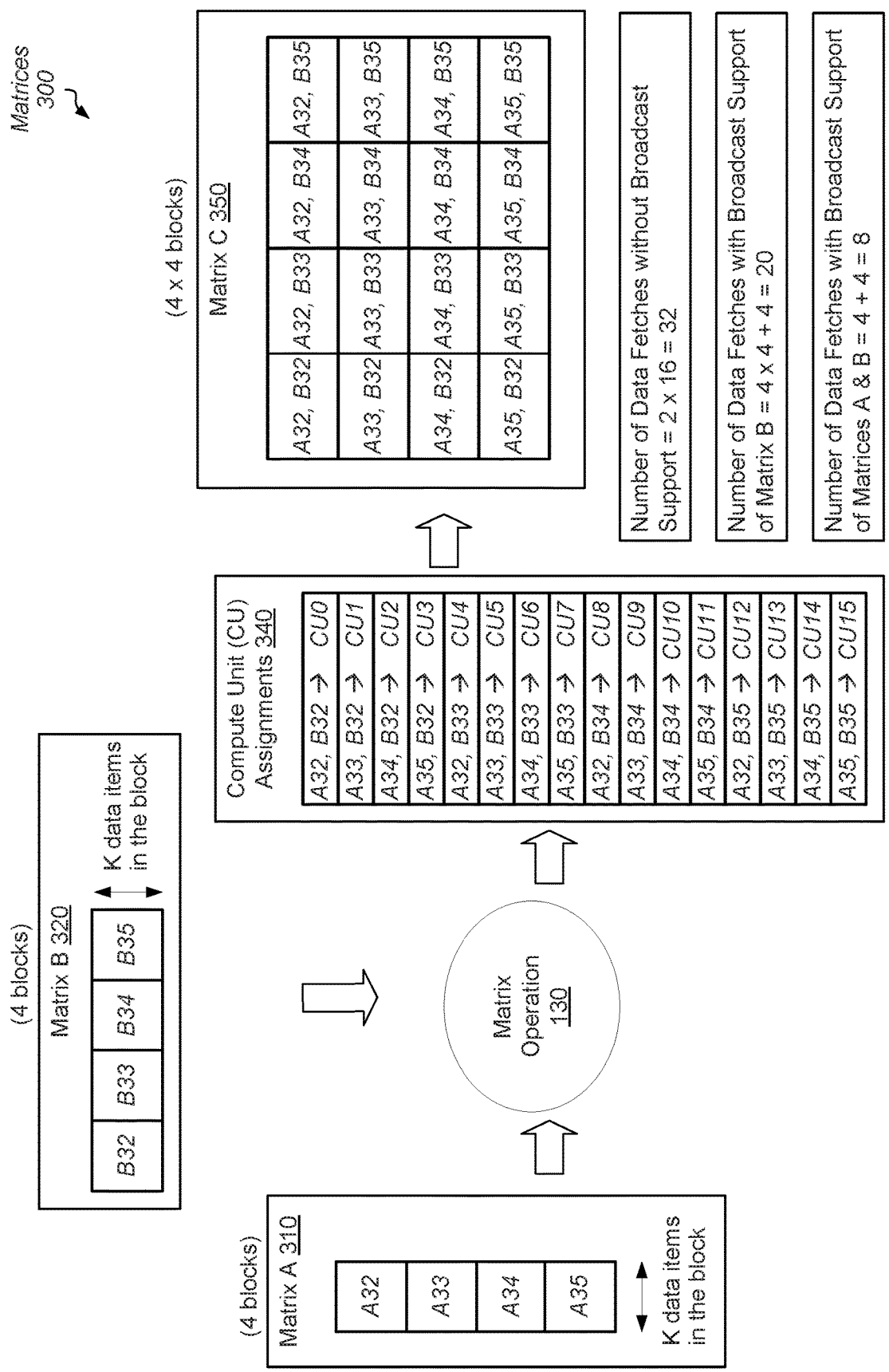
FIG. 3 is a block diagram of one embodiment of matrices.

Turning now to FIG. 3, one embodiment of matrices 300 used in operations is shown. Control logic described earlier is numbered identically. As shown, Matrix A 310 and Matrix B 320 are inputs to a matrix operation 130, which generates Matrix C 350. Similar to the matrices 100 and 200, the matrix operation 130 and the matrices 310, 320 and 350 are used in the training of neural networks, pixel interpolation during video graphics rendering, or one of a multiple other scientific and business applications. In various embodiments, the matrix operation 130 is a GEMM operation. Also shown are the assignments 340 of the input data values of the matrices 310 and 320 to compute units of a SIMD processor core.

The Matrix A 310 is shown to include 4 blocks labeled A32 to A35. In one embodiment, each of the 4 blocks includes K data items. In such an embodiment, the Matrix A 310 has a number of data items equal to 4 times K. Similarly, the Matrix B 320 is shown to include 4 blocks labeled B32 to B35. Matrix B 320 has a number of data items equal to 4 times K. As described earlier, K is a positive, non-zero integer. The value K can be any number, and therefore, the matrices 310 and 320 are capable of being very large. In other embodiments, the value K represents an amount of data, which includes multiple data items.

The Matrix C 350 is shown to include 4×4 blocks. The top row of Matrix C 350 includes blocks labeled (A32, B32), (A32, B33), (A32, B34) and (A32, B35). Each block of the Matrix C 250 includes a combination performed by the matrix operation 130 of a block of Matrix A 310 with a block of Matrix B 320. Therefore, the data items in the matrices 310 and 320 are combined by the matrix operation 130 in an order shown in the Matrix C 350 by the block labels. In some embodiments, a SIMD processor core performs the steps of the matrix operation 130 in a concurrent and parallel manner.

In an embodiment, the SIMD processor core includes 16 compute units (CUs) as shown in the compute unit assignments 340 (or assignments 340), although in other embodiments, the SIMD processor core includes another number of compute units. As shown in the assignments 340, data reuse is typical in GEMM calculations. For example, each of the compute units CU0-CU3 loads and uses the same data in block B32 of Matrix B 320. Similarly, each of the compute units CU4-CU7 loads and uses the same data in block B33 of Matrix B 320, and so on.

Without modification to the SIMD processor core executing the matrix operation 130, in the illustrated embodiment, the SIMD processor core generates 32 data fetches with 2 data fetches per compute unit. For example, compute unit 0 (CU0) uses 2 data fetches for data in block A32 and block B32. Similarly, compute unit 3 (CU3) uses 2 data fetches for data in block A35 and the same block B32. However, if the SIMD processor core is modified to include broadcast support of reuse data (shared data) in Matrix B 320, then, in one embodiment, the SIMD processor core generates 20 data fetches, rather than 32 data fetches. For example, if the SIMD processor core fetches shared data in block B32 only once and broadcasts the fetched, shared data to compute units 0-3, then for the left-most column of Matrix C 350, the software application generates 4 data fetches for data in blocks A32-A35 and a single data fetch for data in block B32. The number of data fetches for the left-most column of Matrix C 250 decreases from 8 data fetches to 5 data fetches.

If the SIMD processor core fetches shared data in block B33 only once and broadcasts the fetched data to compute units 4-7, then for the second left-most column of Matrix C 350, the SIMD processor core generates 5 total data fetches for data in blocks A32-A35 and data in block B33. If the SIMD processor core fetches and broadcasts shared data in blocks B34 and B35 in a similar manner for fetching and broadcasting shared data in blocks B32 and B33, then the total number of fetches is (4×5), or 20 data fetches versus 32 data fetches. If the SIMD processor core additionally fetches shared data in blocks A32-A35 of Matrix A 310 only once and broadcasts the fetched data to compute units 0-15, then the SIMD processor core generates 4 data fetches for data in blocks A32-A35, a single data fetch for data in block B32, and a single data fetch for data in block B33, which provides (4+1+1) data fetches, or 6 data fetches for the two left-most columns of Matrix C 350.

For the two right-most columns of Matrix C 350, two additional data fetches are performed to fetch data in blocks B34 and B35. Therefore, when the software application includes instructions supporting the broadcast of data in Matrix A 310 and Matrix B 320, the total number of data fetches increases from 6 data fetches to 8 data fetches for generating the Matrix C 350 from matrices 310 and 320. If the SIMD processor core supports the broadcast of data only in Matrix B 320, then the number of data fetches decreases from 32 data fetches to 20 data fetches when generating the Matrix C 350 from matrices 310 and 320. In either case, as described earlier for matrices 100 and 200, when the SIMD processor core supports the broadcast of the data, the memory subsystem is not loaded as before without broadcast support, latencies decrease, and performance increases.

Figure 4:
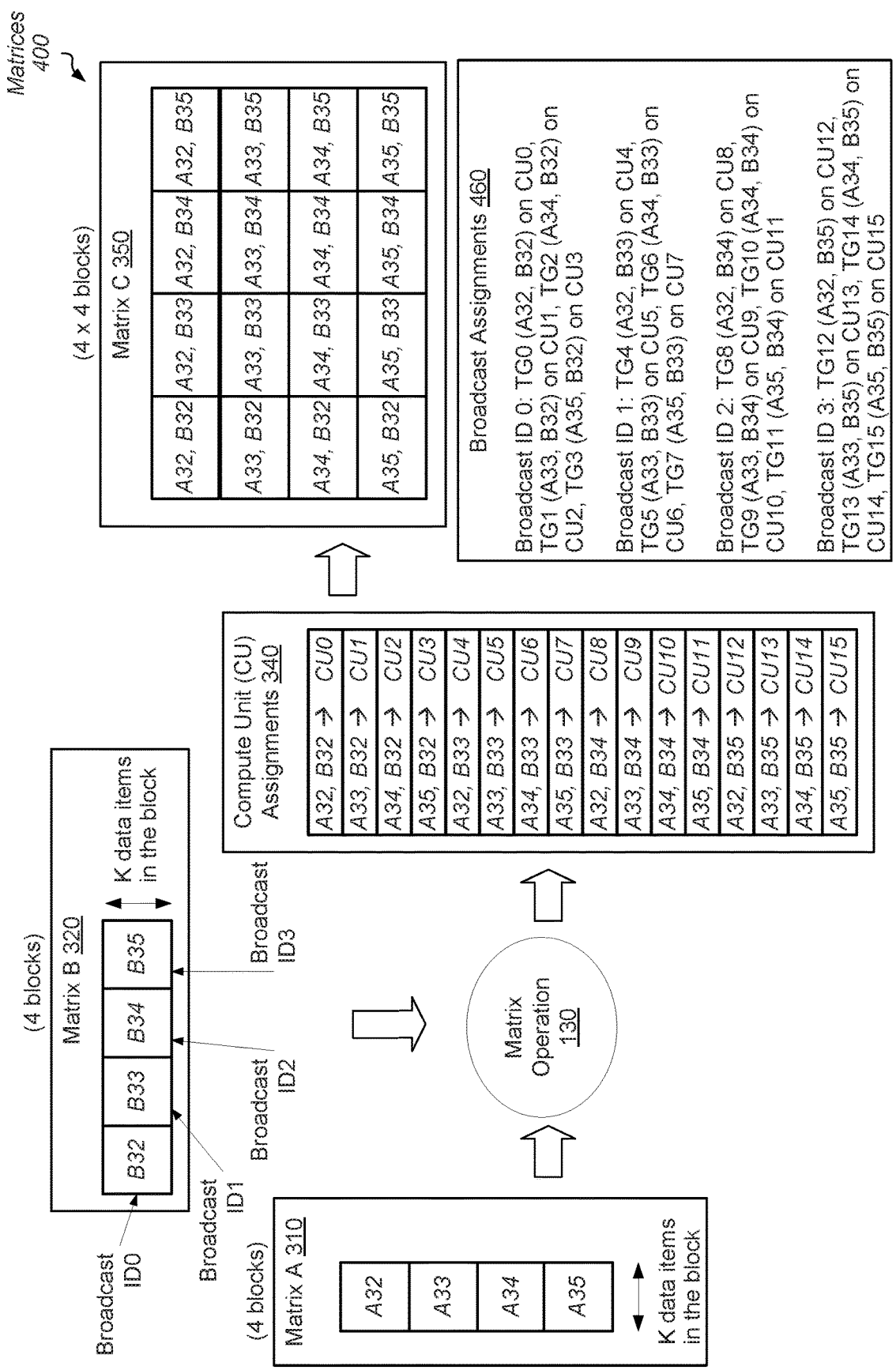
FIG. 4 is a block diagram of one embodiment of matrices.

Turning now to FIG. 4, one embodiment of matrices 400 used in operations is shown. Control logic and data values described earlier are numbered identically. The result Matrix C 350 and the input matrices 310 and 320 are shown again. In order to reduce the number of memory accesses, data in the columns of Matrix B 320 are associated with a broadcast identifier (ID). In one embodiment, instructions of a software application assign the broadcast identifier (ID) 0 to the data in the left-most column of Matrix B 320, which is the block B32. The thread groups (TGs) assigned to the data in block B32 are also assigned to the broadcast identifier 0. Therefore, thread groups 0-3 (TGs 0-3) are assigned to broadcast identifier 0 as shown in the broadcast assignments 460.

The thread groups 0-3 generate the left-most column of Matrix C 350 using the data in block B32 of Matrix B 320. The assignment to the broadcast identifier 0 indicates that the data fetch for the data in block B32 should occur once, rather than four times. For example, the data for a particular data item in the block B32 should be fetched once, rather than each of the four times logic in the four compute units 0-3 (CUs 0-3) generate a read access request for this particular data item. Each of the four CUs 0-3 still generate a read access request for the same data in block B32 while executing instructions of a GEMM software application, but a read access request is not sent to the memory subsystem until each of the four read access requests have been generated. In another example, each of the compute units CU8-CU11 generates a read access request for the same data in block B34. However, a read access request is not sent to the memory subsystem until each of the four read access requests have been generated.

Once each of the four read access requests have been generated, a single, separate read access request is generated and sent to the memory subsystem. This single read access request includes an indication specifying that the read access request is associated with a broadcast of the requested data. In one embodiment, the indication is a bit storing an asserted value to indicate the broadcast of the requested data. The single read access request also includes an indication of which compute units receive the requested data during the broadcast. In some embodiments, the single read access request includes a bit mask specifying which compute units receive the requested data during the broadcast. In other embodiments, the single read access request includes the broadcast identifier, which is later translated or decoded to determine which compute units receive the requested data during the broadcast. Therefore, when the data for block B32 is retrieved a single time from the memory subsystem, this data is concurrently provided to the compute units CU0-CU3. Similarly, when the data for block B34 is retrieved a single time from the memory subsystem, this data is concurrently provided to the compute units CU8-CU11.

Although broadcast identifiers are shown only for Matrix B 320, it is noted that in other embodiments, there are broadcast identifiers for blocks A32-A35 of Matrix A 310. In one embodiment, the thread groups (TGs) 0, 4, 8 and 12 assigned to the data in block A32 and to the compute units CU0, CU4, CU8 and CU12 are also assigned to the broadcast identifier 4 (not shown). In a similar manner, the thread groups (TGs) 1, 5, 9 and 13 assigned to the data in block A33 and to the compute units CU1, CU5, CU9 and CU13 are also assigned to the broadcast identifier 5 (not shown). In such embodiments, the SIMD processor core fetches data for each of the thread groups before executing any one thread group. For example, when broadcast identifiers are used for both matrices 310 and 320, the compute unit CU0 generates read access requests for both the block A 32 and the block B32. However, a single access request for the block B32 using broadcast identifier 0 is not generated until read access requests from compute units C1-C3 are generated. Similarly, a single access request for the block A32 using the broadcast identifier 4 (now shown) is not generated until read access requests from compute units C4, C8 and C12 are generated.

Turning now to FIG. 5, one embodiment of a table 500 for supporting data broadcast for matrix operations is shown. In some embodiments, the instructions of a software application, such as a GEMM software application, includes instructions, which are executed by a SIMD processor core for setting up the table 500. In an embodiment, a particular compute kernel includes the instructions. In another embodiment, the application includes the table setup instructions prior to the function calls used to define the compute kernels with the GEMM operations. Table 500 includes fields 512-524 for storing information used during the broadcast of shared data during matrix operations such as GEMM operations. The table 500 is stored in a set of registers, a random access memory, a content addressable memory, or other. In some embodiments, table 500 is setup as shown with each entry allocated for particular shared data to be broadcast. In other embodiments, each entry is a separate table. The table 500 provides the mappings (assignments) of thread groups to compute units.

Field 512 stores the broadcast identifier for shared data. As shown earlier in FIG. 4, each of the blocks B32-B35 of the Matrix B 320 has a unique broadcast identifier, which distinguishes the shared data of a particular block (e.g., B32) from the shared data of another block (e.g., B35). Field 514 stores an indication of a number of thread groups accessing the shared data identified by the corresponding broadcast identifier. In the earlier example shown for Matrix B 320, four of the sixteen compute units share data of each of the blocks B32-B35. For example, compute units CU0-CU3 share the data of block B32, compute units CU4-CU7 share the data of block B33, and so on. Field 516 stores an indication of the iteration size, which is used to determine an amount of shared data to fetch. For each single data fetch of shared data, a particular amount of the shared data is fetched, or retrieved. The indication of the amount of shared data is specified as a fraction of the total amount of the shared data, as a number of data items, as an absolute amount of data, or other. In some embodiments, the amount of shared data to fetch is specified in the original read access request targeting the shared data.

Field 518 stores a base address for the shared data of a particular block such as block B32 of Matrix B 320. The base address specifies a memory location storing a beginning of the shared data. As shown, the shared data corresponding to the broadcast identifier 0 has a base address of 0x04DE_8F10. Here, the notation "0x" indicates a hexadecimal value. The base address is also a reference address. In order to obtain absolute addresses of other data within the shared data, a particular displacement (or offset) value is added to the base address. When a first read access request targets the first quarter of the shared data, the base address and the size value indicating a quarter of the shared data is used in the first read access request. When a second read access request targets the second quarter of the shared data, a size of the quarter of the shared data is added as a displacement to the base address to provide the target address. In addition, a size value indicating a quarter of the shared data is used in the second read access request.

In an embodiment, instructions of the software application, which are executed on a processor core, also compare target addresses of read access requests to the base addresses in the field 518. When a target address is within a range of the base addresses in field 518, the corresponding read access request is targeting shared data and this read access request should be converted into a single read access request supporting the broadcast of the shared data. Field 520 stores a count of a number of outstanding read access requests targeting the corresponding shared data. As described earlier, the field 514 stores an indication of a number of thread groups accessing the shared data identified by the corresponding broadcast identifier.

Each time instructions of the software application cause logic in the processor core to detect an outstanding read access request targets particular shared data, the corresponding count in field 520 is updated. In an embodiment, updating the value stored in field 520 includes incrementing the value. In such embodiments, the initial value stored in field 520 is zero. In other embodiments, the initial value is equal to the value stored in field 514, and updating the value stored in field 520 includes decrementing the value. When the value stored in field 520 is not equal to a threshold value, the instructions of the software application cause logic in the processor core to prevent sending a read access request targeting the shared data. When updating the value stored in field 520 includes incrementing the value, the threshold value is the value stored in field 514. When updating the value stored in field 520 includes decrementing the value, the threshold value is zero.

When the value stored in field 520 is equal to the threshold value, in some embodiments, the instructions of the software application cause logic in the processor core to generate a single read access request used for broadcasting shared data. In other embodiments, circuitry in the processor core determines the value stored in field 520 is equal to the threshold value, and generates the single read access request without executing particular instructions directing the circuitry to do so. As described earlier, in an embodiment, this single read access request includes a bit storing an asserted value to indicate the broadcast of the requested data. This single read access request also includes an indication of which compute units receive the requested data during the broadcast. In some embodiments, this single read access request includes the broadcast identifier stored in field 512, which is later translated or decoded to determine which compute units receive the requested data during the broadcast. In other embodiments, this single read access request includes a bit mask specifying which compute units receive the requested data during the broadcast.

Field 522 stores the bit mask specifying which compute units receive the requested data during the broadcast. As shown, the shared data corresponding to broadcast identifier 0 includes the bit mask 0xF000, which specifies the compute units CU0-CU3 use the shared data. The shared data corresponding to broadcast identifier 1 includes the bit mask 0x0F00, which specifies the compute units CU4-CU7 use the shared data, and so on. In embodiments where the broadcast identifier is later decoded to generate the bit mask, the field 522 is not used in table 500. In some embodiments, table 500 includes field 524, which stores a size of the shared data. In the example, the shared data has a size of 2 kilobytes (KB). In another embodiment, field 524 includes an ending address for the shared data, so the addresses in the fields 518 and 524 provides the address range for the shared data. In yet other embodiments, logic uses the iteration size in field 516 and the based address in the field 518 to determine the address range and/or size of the shared data.

Turning now to FIG. 6, one embodiment of source code 600 utilizing broadcast support of shared data is shown. In various embodiments, a computing system includes system memory for storing an operating system, software applications developed by designers, and both user data and result data of the software applications. The computing system also includes a processing unit, which accesses the system memory, stores the information in a cache memory subsystem, and executes instructions of the operating system and the applications. The processing unit includes one or more processor cores with a single instruction multiple data (SIMD) parallel architecture. In an embodiment, an accelerated processing unit on a motherboard includes the SIMD processor cores in addition to a general-purpose processor. In another embodiment, a video graphics card includes the SIMD processor cores. Code 600 represents one example of a software application stored in the system memory. In some embodiments, portions of code 600 are also instructions of firmware stored in memory other than system memory or the cache memory subsystem such as an erasable read only memory or other random access memory. Code 600 includes instructions for directing a SIMD processor core or other circuitry to perform GEMM operations. Code 600 also includes code segments 610, 620 and 630 for supporting the broadcast of shared data.

In some embodiments, software developers use a parallel computing platform and corresponding application programming interface (API) models for developing the software applications using GEMM operations. An example of the parallel computing platform is the OpenCL® (Open Computing Language) framework. The OpenCL framework improves computing performance for a wide variety of data-parallel applications used in gaming, entertainment, science and medical fields. The OpenCL framework (generally referred to herein as "OpenCL") includes a C-like language. For video graphics applications, one example of the language is the GLSL (OpenGL Shading Language). A function call in the C-like language is referred to as an OpenCL kernel, a software kernel, a compute kernel, or simply a "kernel".

In an embodiment, code 600 is matched with data items to form work units and thread groups, which are assigned to compute units of the SIMD processor core. As shown earlier, in one embodiment, the assignments are performed by creating the table 500 (of FIG. 5). The code segments 610, 620 and 630 include instructions for supporting the broadcasting of shared data to multiple compute units. However, the compute kernels executing on the compute units of the SIMD processor core receive no indication from any other compute kernel specifying that the shared data is shared with any other compute unit. In various embodiments, code 600 is a computer program that includes a collection of compute kernels and internal functions. A software developer typically defines the compute kernels, whereas the internal functions are often defined in a library.

In some embodiments, code 600 operates on a particular column of a matrix such as the earlier Matrix B 320. A column of Matrix B 320 is a particular block such as block B32, B33 and so on. Each compute unit, such as CUs 0-15 in the earlier examples, executes the instructions of code 600, but operates on different data items. The earlier examples shown for matrices 100, 200, 300 and 400 illustrate that the compute units are grouped differently when sharing data. The sharing is based on the input matrices. Code segment 610 generates the mappings of thread groups to compute units. For example, code segment 610 builds one or more tables for supporting the broadcast of shared data by building a table similar to table 500 (of FIG. 5), which also assigns thread groups to particular compute units. In some embodiments, code segment 610 is placed in an outer loop, which includes code 600 within the loop. In an embodiment, each iteration of the "for loop" in code 600 operates on a partition or a subset of a column of a matrix such as Matrix B 350. For example, each iteration operates on one quarter of the data in block B32 of Matrix B 350. In some embodiments, field 516 of table 500 specifies the iteration size.

In various embodiments, when code segment 620 detects the generation of a read access request for shared data, code segment 620 generates a broadcast start message. In some embodiments, the code 600 include hints from a static compiler that indicate which read access requests target shared data and additionally which broadcast identifier corresponds to the shared data. For example, the static compiler compares the target addresses of the read access requests to address ranges of shared data. Therefore, code segment 620 detects the compiler hints. In other embodiments, no compiler hints are used, and code segment 620 performs the comparisons of target addresses of the read access requests to address ranges of shared data. The message includes an indication specifying the start of broadcast data, the corresponding broadcast identifier, and the target address.

In one embodiment, instructions of code 600 between code segments 620 and 630 fetch data for another matrix such as Matrix A 310 or another Matrix A of earlier examples. These instructions also store the fetched data in the local data store (LDS) of the corresponding compute unit. The instructions perform the fetching and storing on an individual basis for each data item. Code segment 630 detects the start of the broadcast message for Matrix B and updates a count such as the count of a number of read access requests targeting the same shared data. Code segment 630 also compares this count to a total number of thread groups sharing the shared data. This threshold is the same as the threshold stored in field 514 of table 500. When the count equals the threshold, code segment 630 generates a separate single read access request and sends it to the memory subsystem for fetching the requested data. In various embodiments, the hardware of the SIMD processor core executes code segment 630 which generates a start signal. The hardware then performs the steps of detecting the start of the broadcast message, updating the count, comparing to the threshold and generating the single read access request. These and other embodiments are possible and are contemplated.

The generated single read access request includes an indication specifying that the read access request is associated with a broadcast of the requested data. In one embodiment, the indication is a bit storing an asserted value to indicate the broadcast of the requested data. The single read access request also includes an indication of which compute units receive the requested data during the later broadcast. In some embodiments, the single read access request includes a bit mask specifying which compute units receive the requested data during the broadcast such as the bit mask in field 522 of table 500. In other embodiments, the single read access request includes the broadcast identifier, which is later translated or decoded to determine which compute units receive the requested data during the broadcast. Therefore, when the memory subsystem provides the requested shared data based on a single memory access, this data is concurrently provided to the local data stores of the specified compute units. The code after code segment 630 reads data from the local data stores and performs the matrix operations, such as GEMM operations, using the data. The "for loop" of code 600 is repeated as necessary.

Figure 7:
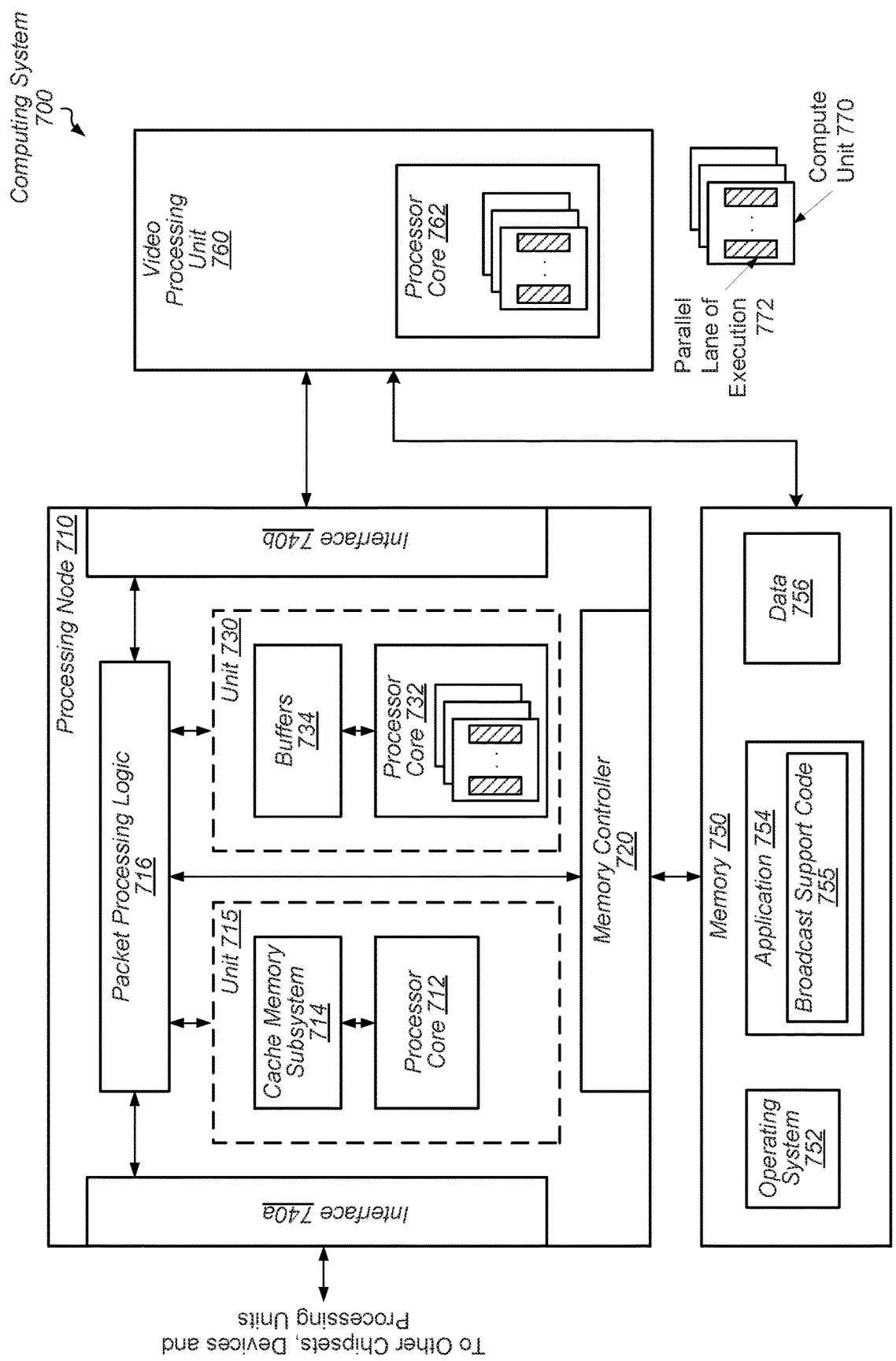
FIG. 7 is a block diagram of one embodiment of a computing system supporting the broadcast of shared data for matrices.

Referring to FIG. 7, one embodiment of a computing system 700 supporting the broadcast of shared data for matrices is shown. Processing node 710 includes one or more processing units such as unit 715 and unit 730. Unit 715 includes one or more processor cores 712 and an associated cache memory subsystem 714. Unit 730 includes one or more processor cores 732 and data storage buffers 734. The processing node 710 also includes memory controller 720, and interfaces 740*a* and 740*b*. The memory controller 720 includes logic and queues for servicing memory requests and memory responses, and communicating with memory 750 based on particular communication protocols. Interfaces 740*a*-740*b* also include logic and queues for servicing requests and responses, and for communicating with particular devices based on appropriate communication protocols. In one embodiment, interface 740*b* communicates with the video processing unit 760. In one embodiment, the illustrated functionality of at least processing node 710 is incorporated upon a single integrated circuit. In some embodiments, the functionality of the computing system 700 is incorporated on a system on chip (SoC). In yet other embodiments, the functionality of the video processing unit 760 is incorporated on a video graphics card inserted in a motherboard, which also includes the processing node 710 and interfaces to memory 750.

Other components such a phased locked loops (PLLs) and other clock generation circuitry, a power management unit, a shared cache memory subsystem, and so forth are not shown for ease of illustration. In one embodiment, processor core 712 utilizes a general-purpose micro-architecture. Processor core 732 is not a mirrored silicon image of processor core 712. Rather, processor core 732 has a micro-architecture different from the micro-architecture used by processor core 712. In one embodiment, the processor core 732 has a micro-architecture that provides high instruction throughput for a computationally intensive task such as a parallel data architecture. In an embodiment, the processor core 732 has a single instruction multiple data (SIMD) core. Examples of SIMD cores include graphics processing units (GPUs), digital signal processing (DSP) cores, or other. In a similar manner, processor core 762 of the video processing unit 760 also has a SIMD architecture. Each of the processor cores 732 and 762 include multiple compute units 770, each with multiple, parallel lanes 772 of execution. In one embodiment, processor core 762 has 16 compute units, each with 64 parallel lanes of execution. In other embodiments, another number of compute units and parallel lanes of execution are used.

Generally, processor core 712 accesses the cache memory subsystems 714, respectively, for data and instructions. If the requested block is not found in cache memory subsystem 714, then the processor core 712 generates a read access request and transmits it to the memory 750 via the memory controller 720. In a similar manner, processor core 732 generates memory access to transmit to memory 750 when requested data is not found in the buffers 734. In an embodiment, one or more of cache memory subsystem 714 and buffers 734 include high-speed cache memories configured to store blocks of data, and are implemented as a hierarchy of caches. Both the cache memory subsystem 714 and buffers 734 include a cache array memory and a corresponding cache controller.

Generally, packet processing logic 716 responds to control packets received on the links to which processing node 710 is coupled, to generate control packets in response to processor cores 712 and/or cache memory subsystems 714, to generate probe commands and response packets in response to transactions selected by memory controller 720 for service, and to route packets for which node 710 is an intermediate node to other nodes through interface logic 740a.

In some embodiments, the processor core 762 executes graphics-intensive applications, such as vertex shaders or pixel shaders, on large numbers of objects (vertices or pixels). Since each object is processed independently of other objects, but the same sequence of operations is used, the SIMD architecture using the compute units 770 and the lanes 772 provides considerable performance enhancement. In some embodiments, the processor core 732 executes applications directed at neural network training, which also processes objects independently of other objects, but the same sequence of operations is used. Therefore, these types of applications also benefit from the SIMD architecture using the compute units 770 and the lanes 772.

In various embodiments, the memory 750 includes one or more of a hard disk drive, a solid state disk, other types of flash memory, a portable solid state drive, a tape drive and so on. The memory 750 stores the operating system 752, the application 754 and data 756. Although a single operating system and a single application are shown, in other embodiments, another number of these software components are stored in memory 750. The operating system 752 includes instructions for initiating the boot up of the processing node 710, assigning tasks to hardware circuitry, managing resources of the computing system 700 and hosting one or more virtual environments.

In some embodiments, the general-purpose processor core 712 executes the instructions of the operating system 752. In some embodiments, the application 754 uses GEMM operations for neural network training, pixel interpolation during graphics rendering, or other. In one embodiment, the application 754 matches its software kernels with one or more records of data, such as data items in the data 756, to produce one or more work units of computation. The work units are partitioned into thread groups, each with its own assigned unique identifier (ID). The application 754 also includes code for supporting the broadcast of shared data such as broadcast support code 755. In one embodiment, the code 755 is similar to the code segments 610, 620 and 630 of code 600 (of FIG. 6). When executing the application 754 and the code 755, one or more of the processor cores 732 and 762 include circuitry for supporting the broadcast of shared data.

One or more of a compiler, the code 755 and firmware assign thread groups to compute units 770 in one or more of the SIMD processor core 732 and the SIMD processor core 762 depending on the application being processed. In one embodiment, the assignments are performed by creating the table 500 (of FIG. 5). In some embodiments, one of the processor cores 732 and 762 create the table. For example, in one embodiment, the application 754 assigns thread groups for pixel interpolation to the SIMD processor core 762 of the video processing unit 760, and the application 754 assigns thread groups for neural network training to the SIMD processor core 732 of the unit 730. Other types of assignments for these and other applications are possible and contemplated. When the software application 754 includes code 755 for supporting the broadcast of the shared data, which is executed by one or more of the processor cores 732 and 762, the shared data is fetched only once. When the shared data is fetched only once, the memory subsystem is not loaded as without broadcast support, latencies decrease, and system performance increases.

Figure 8:
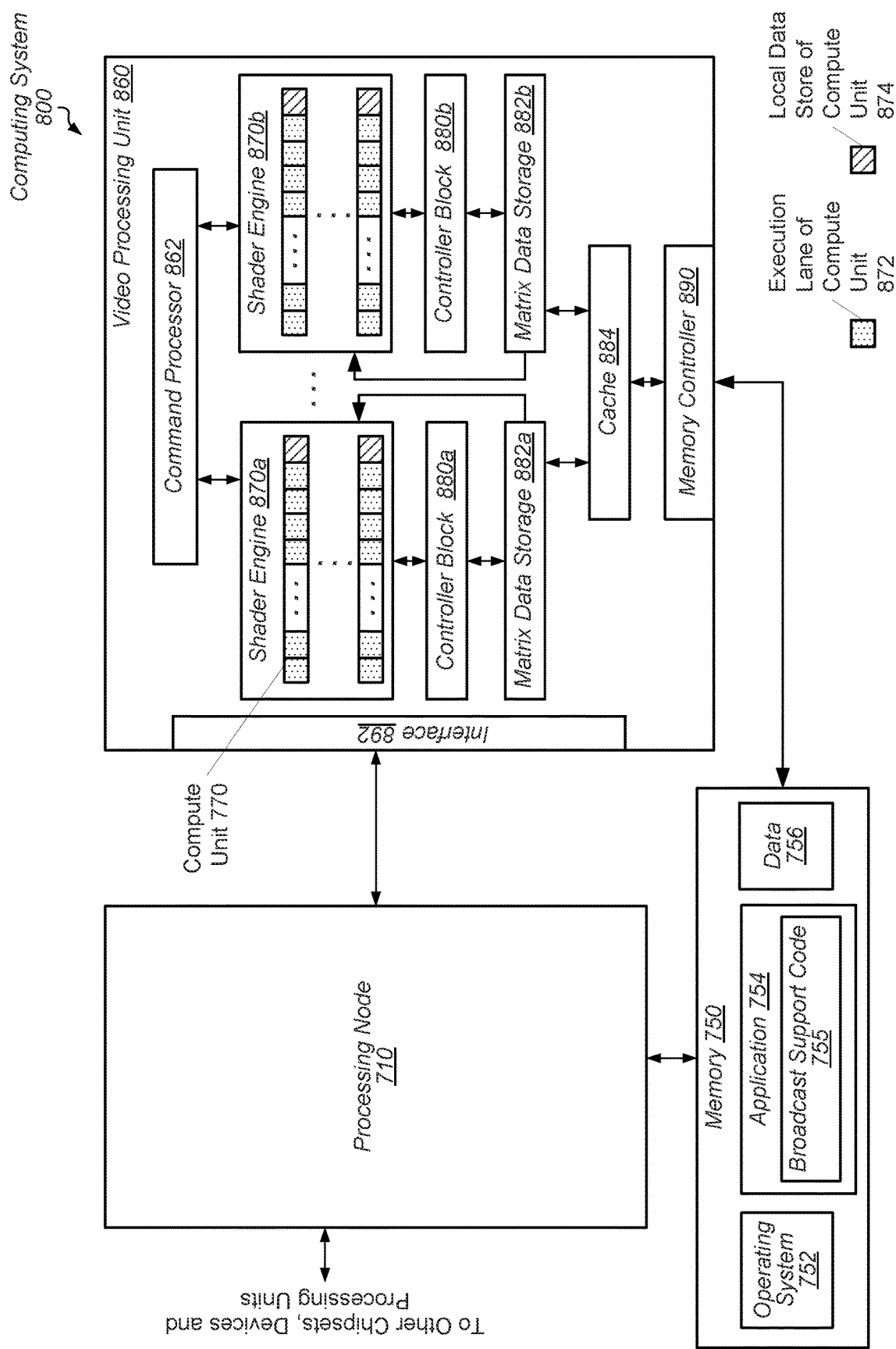
FIG. 8 is a block diagram of one embodiment of a computing system supporting the broadcast of shared data for matrices.

Referring to FIG. 8, one embodiment of a computing system 800 supporting a shared data broadcast protocol is shown. Control logic and circuitry described earlier is numbered identically. Computing system 800 includes processing node 710, memory 750 and video processing unit 860 (or unit 860). In one embodiment, the illustrated functionality of computing system 800 is incorporated upon a single integrated circuit. In some embodiments, the functionality of the computing system 800 is incorporated on a system on chip (SoC). In yet other embodiments, the functionality of the video processing unit 860 is incorporated on a video graphics card inserted in a motherboard, which also includes the processing node 710 and interfaces to memory 750.

Unit 860 includes shader engines 870a-870b, controller blocks 880a-880b, matrix data storage 882a-882b, cache 884 and memory controller 890. Other components such a PLLs, any power management logic, a bus or fabric, and so forth are not shown for ease of illustration. Interface 892 of unit 860 includes logic and queues for servicing requests and responses, and for communicating with processing node 710 based on appropriate communication protocols. Similarly, memory controller 890 includes logic and queues for servicing memory requests and memory responses, and communicating with memory 750 based on particular communication protocols. In an embodiment, cache 884 is a level-two (L2) cache in a cache memory subsystem. However, in other embodiments, cache 884 is another level in the cache memory subsystem. In some embodiments, the matrix data storage 882a-882b stores data only for matrix operations and a level-one (L1) cache (not shown) stores data for other operations. Therefore, in some embodiments, matrix data storage 882a-882b includes the equivalent of L1 cache controllers and cache 884 includes an L2 cache controller.

A command processor 862 schedules received command groups onto compute resources, such as shader engines 870a-870b, based on state information. Examples of the state information are a process identifier (ID), a protected/unprotected mode/state, a compute or graphics type of work, and so on. Each of the shader engines 870a-870b include multiple compute units, each with multiple parallel execution lanes 872 and local data store 874. The local data store 874 is implemented with registers, random access memory, or other. Register files, other buffers and pipeline control logic for the shader engines 870a-870b are now shown for ease of illustration. In one embodiment, unit 860 has 4 shader engines, each shader engine with 16 compute units, and each compute unit with 64 parallel lanes of execution. In other embodiments, another number of shader engines, compute units and parallel lanes of execution are used.

Unit 860 also includes the controller blocks 880a-880b, which are implemented by hardware, such a circuitry, software, such as firmware, or a combination of hardware and software. In some embodiments, the controller blocks 880a-880b (or control blocks 880a-880b) stage and organize the loading of shader input data to the shader engines 870a-870b and manages resources used to execute shader programs. In some embodiments, the controller blocks 880a-880b create the table 500 (of FIG. 5), receive read access requests from the compute units of the shader engines 870a-870b, maintain counts of read access requests targeting particular shared data, generate single access requests for the shared data, and issue single access requests to cache 884 via the matrix data storage 882a-882b.

In an embodiment, the matrix data storage 882a-882b store the received single access requests, and issue them to the cache 884 based on arbitration logic. The arbitration logic selects access requests to issue to the cache 884 based on one or more of priority levels, an age, a quality of service parameter, a source identifier and so on. The single access requests include one or more of the broadcast identifier and bit mask as described earlier. In one embodiment, matrix data storage 882a-882b determines a bit mask for identifying compute units for receiving shared data by receiving the bit mask from the controller blocks 880a-880b. In another embodiment, matrix data storage 882a-882b determines the bit mask by translating the broadcast identifier in the single access request. When the matrix data storage 882a-882b receive the requested data, the matrix data storage 882a-882b sends the requested data to multiple compute units, rather than a single compute unit. Logic in the matrix data storage 882a-882b selects the multiple compute units based on a bit mask. Selection logic, such as multiplexers or other, in the shader engines 870a-870b, use the bit mask to determine which compute units receive the broadcasted response data. In other embodiments, the response data is serially supplied, rather than simultaneously provided, from the matrix data storage 882a-882b to the compute units. However, the matrix data storage 882a-882b still provides the response data to multiple compute units, and the response data was accessed from the cache 884 by a single read access request, rather than accessed by multiple read access requests.

Figure 9:
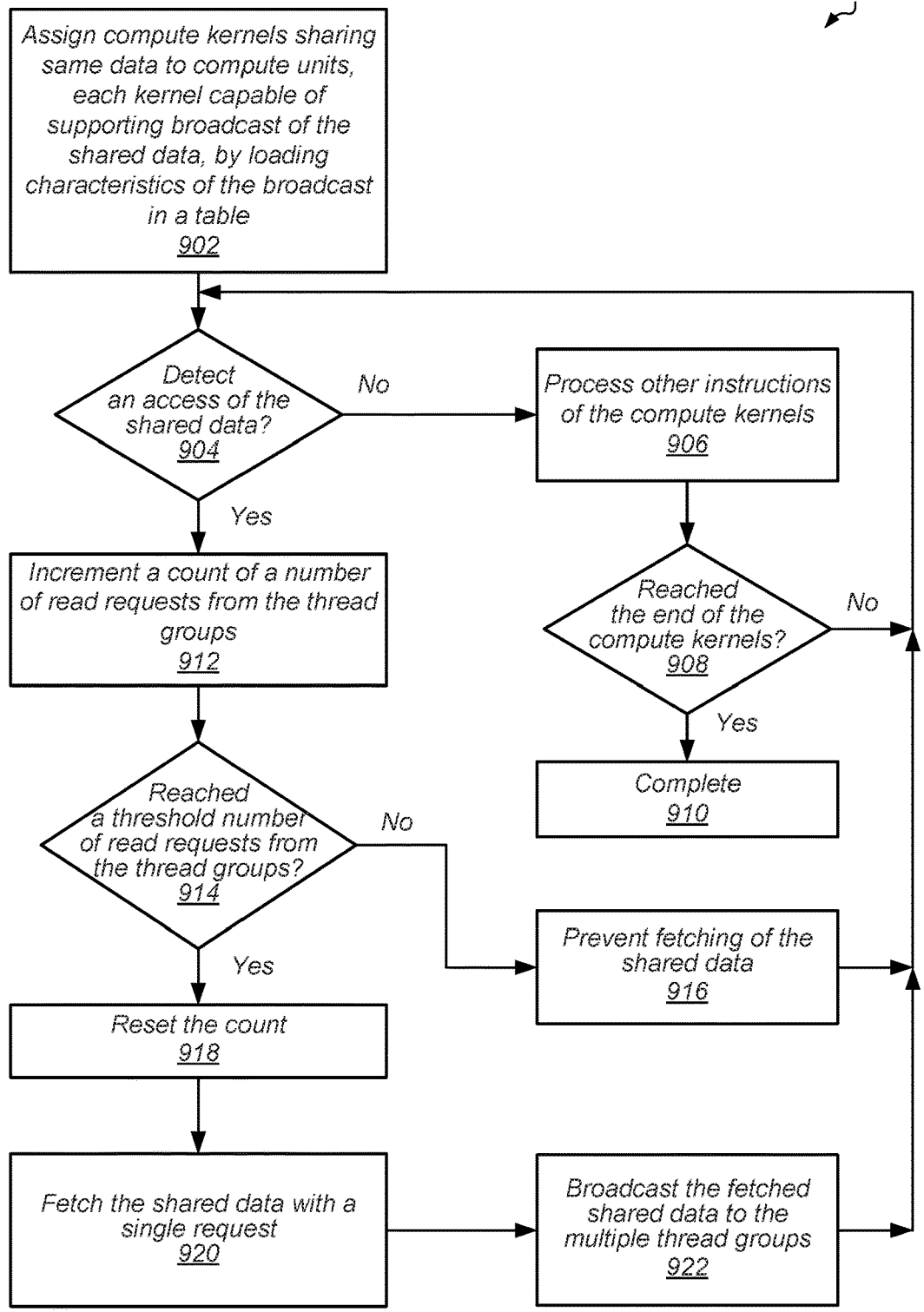
FIG. 9 is a flow diagram of one embodiment of a method for efficient parallel execution of multiple work units in a processor by reducing a number of memory accesses.

Referring now to FIG. 9, one embodiment of a method 900 for supporting a shared data broadcast protocol is shown. For purposes of discussion, the steps in this embodiment are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 900.

Software developers design an application with GEMM operations. In one embodiment, logic and circuitry of a parallel data processor core (or processor core) executes the instructions of the application to perform the GEMM operations. In one embodiment, the application includes code similar to code 600 (of FIG. 6). The application generates multiple compute kernels. The processor core assigns compute kernels sharing same data to compute units of the processor core. The processor core supports the broadcast of the shared data by loading characteristics of the broadcast in a table (block 902). The application has its compute kernels matched with one or more records of data, such as data items, to produce one or more work units of computation. The work units are partitioned into thread groups, each with its own assigned unique identifier (ID). The processor core assigns these thread groups to compute units in the processor core. In one embodiment, the assignments are performed by creating the table 500 (of FIG. 5) with information in one or more of the fields 512-524.

In some embodiments, the application includes hints from a static compiler that indicate which read access requests target shared data and additionally which broadcast identifier corresponds to the shared data. For example, the static compiler compares the target addresses of the read access requests to address ranges of shared data. During execution of the application, if the processor core does not detect a memory access to target shared data ("no" branch of the conditional block 904), then the application processes other instructions of the compute kernels (block 906). If the end of the compute kernels is reached ("yes" branch of the conditional block 908), then method 900 completes (block 910). However, if the end of the compute kernels is not reached ("no" branch of the conditional block 908), then control flow of method 900 returns to the conditional block 904 where the processor core determines whether a memory access of shared data has occurred.

If the processor core detects that a memory access detects shared data, such as the processor core detects a compiler hint ("yes" branch of the conditional block 904), then when executing the instructions of the application or firmware, circuitry of the processor core increments a count of a number of read requests from the thread groups targeting the same shared data (block 912). In an embodiment, the application updates the field 520 of table 500. If a threshold number of read requests from the thread groups has not been reached ("no" branch of the conditional block 914), then the processor core prevents fetching of the shared data (block 916). The processor core does not issue a read access request to the memory subsystem.

In one embodiment, the processor core compares the updated value in field 520 of table 500 to the threshold value in field 514 of table 500. If the threshold number of read requests from the thread groups is reached ("yes" branch of the conditional block 914), then the processor core resets the count (block 918). The processor core fetches the shared data with a single read access request (block 920). For example, the processor core issues to the memory subsystem the single read access request described earlier with one or more of a broadcast identifier and a bit mask. When the shared data is returned from the memory subsystem, the processor core broadcasts the shared data to corresponding compute units based on the broadcast characteristics such as the mask (block 922). Afterward, control flow of method 900 returns to conditional block 904 where the processor core determines whether a memory access of shared data has occurred.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system comprising:
   a processor comprising a plurality of compute units, each configured to process instructions;
   a control block; and
   wherein the control block is configured to:
      compare a count of access requests targeting shared data to a number of compute units of the plurality of compute units requiring the shared data;
      convey a single access request targeting the shared data, in response to:
         detecting a first access request from one of the number of compute units requiring the shared data; and
         determining the count of access requests targeting the shared data is equal to the number of compute units requiring the shared data; and
      broadcast the shared data to the compute units requiring the shared data, in response to receiving the shared data.

2. The computing system as recited in claim 1, wherein the control block is further configured to store a size of the shared data.

3. The computing system as recited in claim 1, wherein the control block is further configured to store an ending address of the shared data.

4. The computing system as recited in claim 1, wherein the control block is configured to increment a count of access requests targeting the shared data, responsive to detecting an access request targeting the shared data.

5. The computing system as recited in claim 1, wherein the control block is configured to store broadcast characteristics for the shared data comprising one or more of:
   a broadcast identifier identifying the shared data; and
   a base address specifying a memory location storing a beginning of the shared data.

6. The computing system as recited in claim 5, wherein the control block is configured to store, in the broadcast characteristics, a number equal to a sum of the compute units requiring the shared data.

7. The computing system as recited in claim 5, wherein the control block is configured to insert, in the single access request, one or more of:
   the broadcast identifier; and
   a mask identifying the compute units requiring the shared data.

8. The computing system as recited in claim 7, wherein a cache controller is configured to:
   determine the mask by receiving the mask in the single access request; and
   determine the mask by translating the broadcast identifier in the single access request.

9. The computing system as recited in claim 8, further comprising storage configured to:
   store the mask; and
   convey the mask to the processor during broadcasting of the shared data to the compute units requiring the shared data.

10. The computing system as recited in claim 9, wherein the processor utilizes the mask to select the compute units requiring the shared data for receiving the shared data.

11. A method, comprising:
   comparing, by a control block of a processor, a count of access requests targeting shared data to a number of compute units of a plurality of compute units requiring the shared data;
   conveying, by the control block of the processor to a cache controller, a single access request targeting the shared data, in response to:
      detecting a first access request from one of the number of compute units requiring the shared data; and
      determining the count of access requests targeting the shared data is equal to the number of compute units requiring the shared data; and
   broadcasting, by the processor, the shared data to the compute units requiring the shared data.

12. The method as recited in claim 11, wherein no compute unit of the compute units requiring the shared data receives an indication from any of the compute units requiring the shared data of sharing the shared data.

13. The method as recited in claim 11, further comprising incrementing, by the control block, a count of access requests targeting the shared data for each access request received targeting the shared data.

14. The method as recited in claim 11, further comprising storing, by the control block, broadcast characteristics for the shared data comprising one or more of:
   a broadcast identifier identifying the shared data; and
   a base address specifying a memory location storing a beginning of the shared data.

15. The method as recited in claim 14, further comprising inserting, by the control block, in the single access request, one or more of:
   the broadcast identifier; and
   a mask identifying the compute units requiring the shared data.

16. The method as recited in claim 15, further comprising:
   determining, by the control block, the mask by receiving the mask in the single access request; and
   determining, by the control block, the mask by translating the broadcast identifier in the single access request.

17. An apparatus comprising:
a control block comprising circuitry configured to communicate with a processor comprising a plurality of compute units, each configured to process instructions;
matrix data storage comprising circuitry configured to communicate with a cache controller; and
wherein the control block is configured to receive access requests generated by the plurality of compute units executing a plurality of compute kernels;
wherein the control block is configured to:
  compare a count of access requests targeting shared data to a number of compute units of the plurality of compute units requiring the shared data;
  convey, to the cache controller via the matrix data storage, a single access request targeting the shared data, in response to:
    receiving a first access request from one of the number of compute units requiring the shared data; and
    determining the count of access requests targeting the shared data is equal to the number of compute units requiring the shared data; and
  broadcast the shared data to the compute units requiring the shared data, in response to receiving the shared data.

18. The apparatus as recited in claim 17, wherein no compute unit of the compute units requiring the shared data receives an indication from any of the compute units requiring the shared data of sharing the shared data.

19. The apparatus as recited in claim 17, wherein the control block is configured to increment a count of access requests targeting the shared data for each access request received from the processor targeting the shared data.

20. The apparatus as recited in claim 17, wherein the control block is configured to store broadcast characteristics for the shared data comprising one or more of:
  a broadcast identifier, wherein the broadcast identifier is a unique identifier identifying the shared data; and
  a base address specifying a memory location storing a beginning of the shared data.

* * * * *